US012694476B2

(12) United States Patent　　(10) Patent No.:　US 12,694,476 B2

Otani et al.　　(45) Date of Patent:　Jul. 28, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Go Otani, Kanagawa (JP); Toru Kokura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 18/509,563

(22) Filed: Nov. 15, 2023

(65) Prior Publication Data

US 2024/0193732 A1　Jun. 13, 2024

(30) Foreign Application Priority Data

Dec. 7, 2022　(JP) ................................. 2022-195860

(51) Int. Cl.
G06T 5/00　　(2024.01)
G06T 7/11　　(2017.01)
G06V 10/74　　(2022.01)

(52) U.S. Cl.
CPC ................. G06T 5/00 (2013.01); G06T 7/11 (2017.01); G06V 10/761 (2022.01); G06T 2207/20081 (2013.01)

(58) Field of Classification Search
CPC ... G06T 5/00; G06T 7/11; G06T 2207/20081; G06V 10/761
See application file for complete search history.

(56) References Cited

U.S. PATENT DOCUMENTS

2014/0334720 A1* 11/2014 Shibata ..................... G06T 5/50
382/159

OTHER PUBLICATIONS

A. K. Moorthy and A. C. Bovik, "Blind Image Quality Assessment: From Natural Scene Statistics to Perceptual Quality," in IEEE Transactions on Image Processing, vol. 20, No. 12, pp. 3350-3364, Dec. 2011, doi: 10.1109/TIP.2011.2147325. (Year: 2011).*
Fuoli, Dario et al. "Fourier Space Losses for Efficient Perceptual Image Super-Resolution." 2021 IEEE/CVF International Conference on Computer Vision (ICCV) (2021): 2340-2349. (Year: 2021).*
Yutian Chen, Max Welling, and Alex Smola. 2010. Super-samples from kernel herding. In Proceedings of the Twenty-Sixth Conference on Uncertainty in Artificial Intelligence (UAI'10). AUAI Press, Arlington, Virginia, USA, 109-116. (Year: 2010).*

(Continued)

*Primary Examiner* — Tom Y Lu
*Assistant Examiner* — Shane Wrensford Codrington
(74) *Attorney, Agent, or Firm* — Venable LLP

(57)　　ABSTRACT

An image processing apparatus comprises a first obtaining unit configured to obtain a restoration accuracy of processing for restoring a teacher image from a deteriorated image for which deterioration has been added to the teacher image, a second obtaining unit configured to obtain a frequency characteristic of the teacher image, and a first training unit configured to perform processing for training a learning model based on the restoration accuracy and the frequency characteristic.

11 Claims, 9 Drawing Sheets

(56) References Cited

OTHER PUBLICATIONS

Yoshua Bengio, Jérôme Louradour, Ronan Collobert, and Jason Weston. 2009. Curriculum learning. In Proceedings of the 26th Annual International Conference on Machine Learning (ICML '09). Association for Computing Machinery, New York, NY, USA, 41-48. https://doi.org/10.1145/1553374.1553380 (Year: 2009).*
Shizun Wang, et al., "SamplingAug: On the Importance of Patch Sampling Augmentation for Single Image Super-Resolution," arXiv preprint arXiv:2111.15185 (2021).
"SamplingAug: On the Importance of Patch Sampling Augmentation for Single Image Super-Resolution" article, [0003].

* cited by examiner

F I G. 1

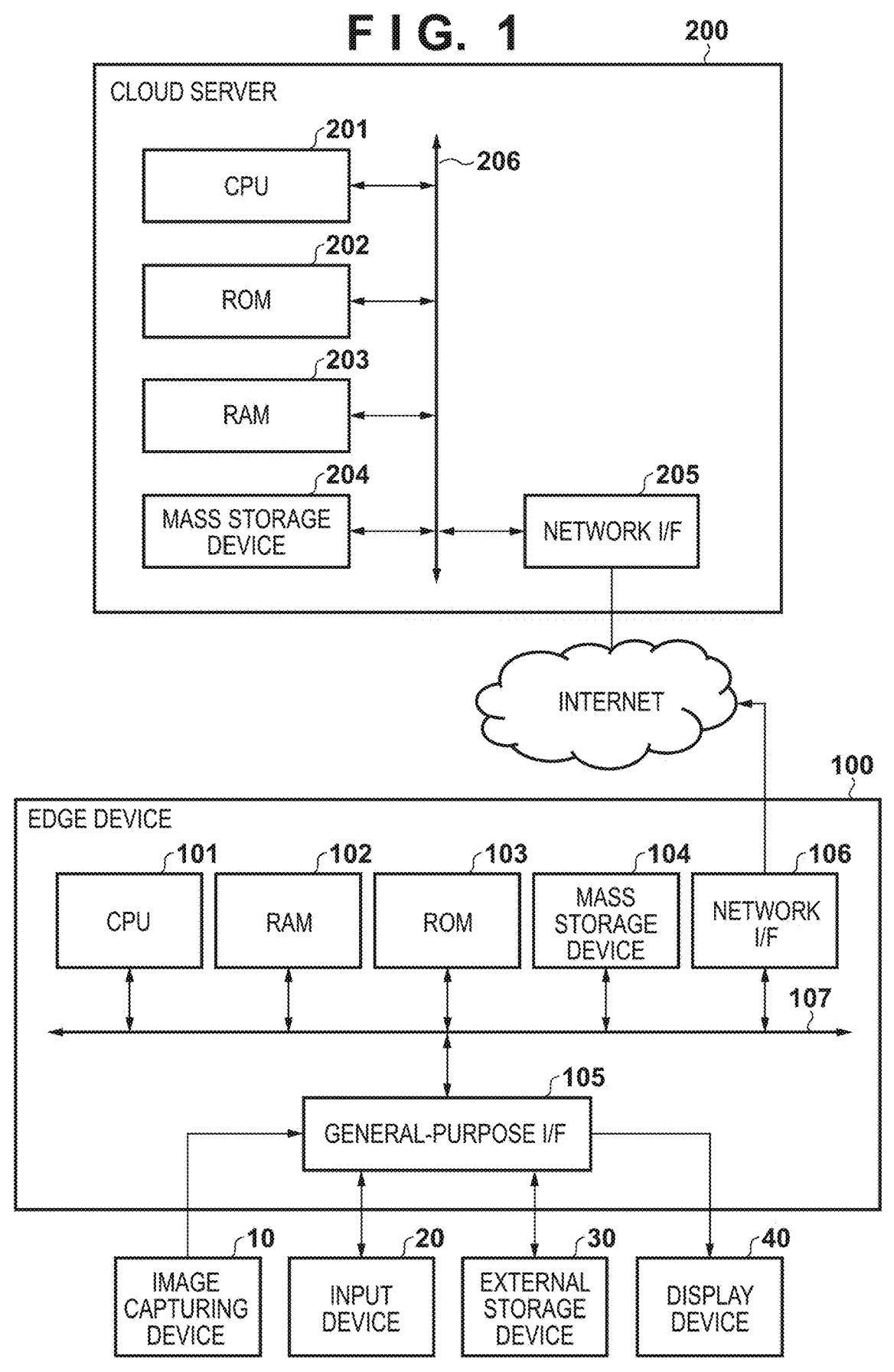

200

CLOUD SERVER

- 201 CPU
- 202 ROM
- 203 RAM
- 204 MASS STORAGE DEVICE
- 205 NETWORK I/F
- 206

INTERNET

100

EDGE DEVICE

- 101 CPU
- 102 RAM
- 103 ROM
- 104 MASS STORAGE DEVICE
- 106 NETWORK I/F
- 107
- 105 GENERAL-PURPOSE I/F

- 10 IMAGE CAPTURING DEVICE
- 20 INPUT DEVICE
- 30 EXTERNAL STORAGE DEVICE
- 40 DISPLAY DEVICE

FIG. 4

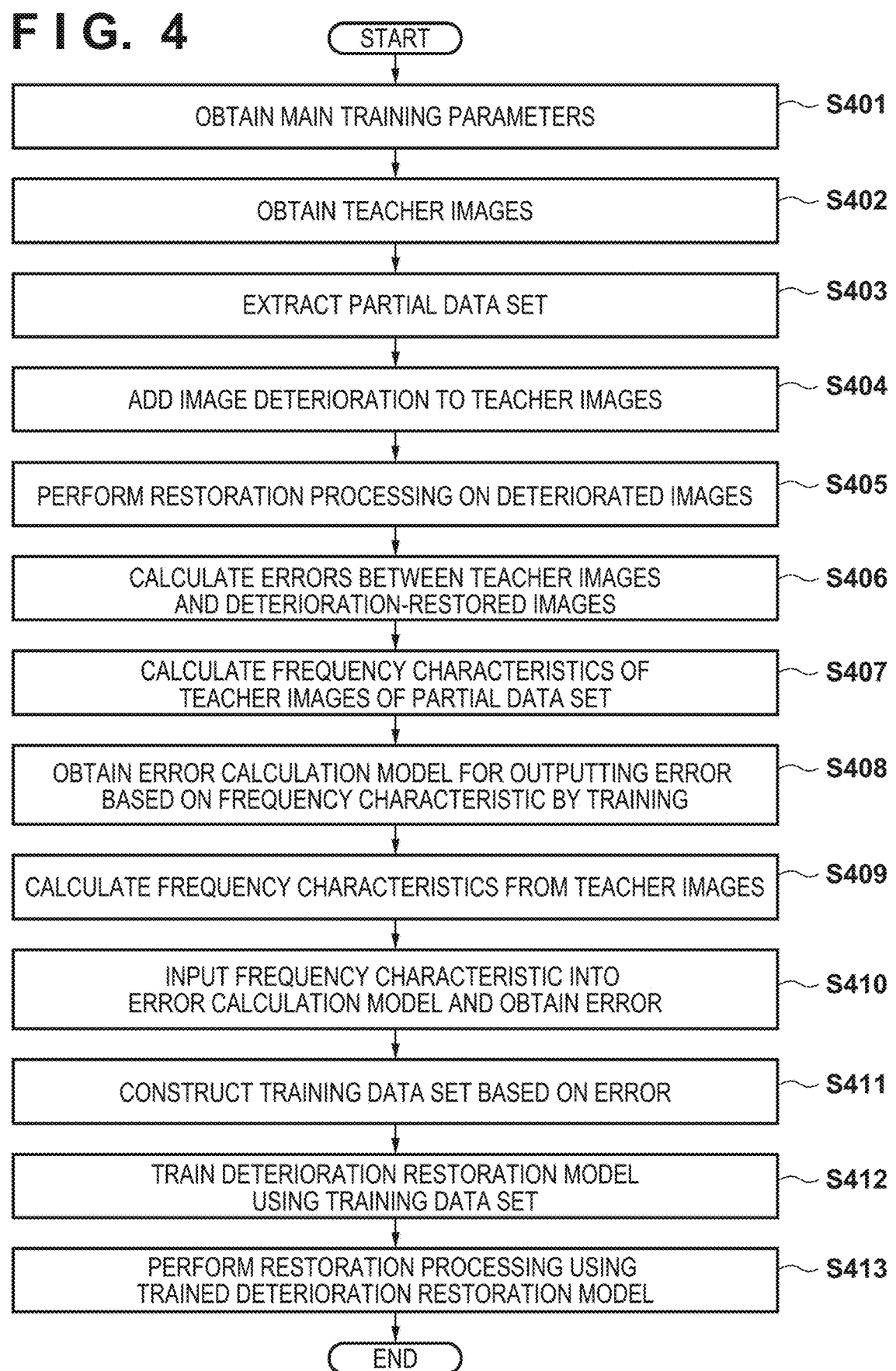

START

OBTAIN MAIN TRAINING PARAMETERS　— S401

OBTAIN TEACHER IMAGES　— S402

EXTRACT PARTIAL DATA SET　— S403

ADD IMAGE DETERIORATION TO TEACHER IMAGES　— S404

PERFORM RESTORATION PROCESSING ON DETERIORATED IMAGES　— S405

CALCULATE ERRORS BETWEEN TEACHER IMAGES
AND DETERIORATION-RESTORED IMAGES　— S406

CALCULATE FREQUENCY CHARACTERISTICS OF
TEACHER IMAGES OF PARTIAL DATA SET　— S407

OBTAIN ERROR CALCULATION MODEL FOR OUTPUTTING ERROR
BASED ON FREQUENCY CHARACTERISTIC BY TRAINING　— S408

CALCULATE FREQUENCY CHARACTERISTICS FROM TEACHER IMAGES　— S409

INPUT FREQUENCY CHARACTERISTIC INTO
ERROR CALCULATION MODEL AND OBTAIN ERROR　— S410

CONSTRUCT TRAINING DATA SET BASED ON ERROR　— S411

TRAIN DETERIORATION RESTORATION MODEL
USING TRAINING DATA SET　— S412

PERFORM RESTORATION PROCESSING USING
TRAINED DETERIORATION RESTORATION MODEL　— S413

END

F I G. 5
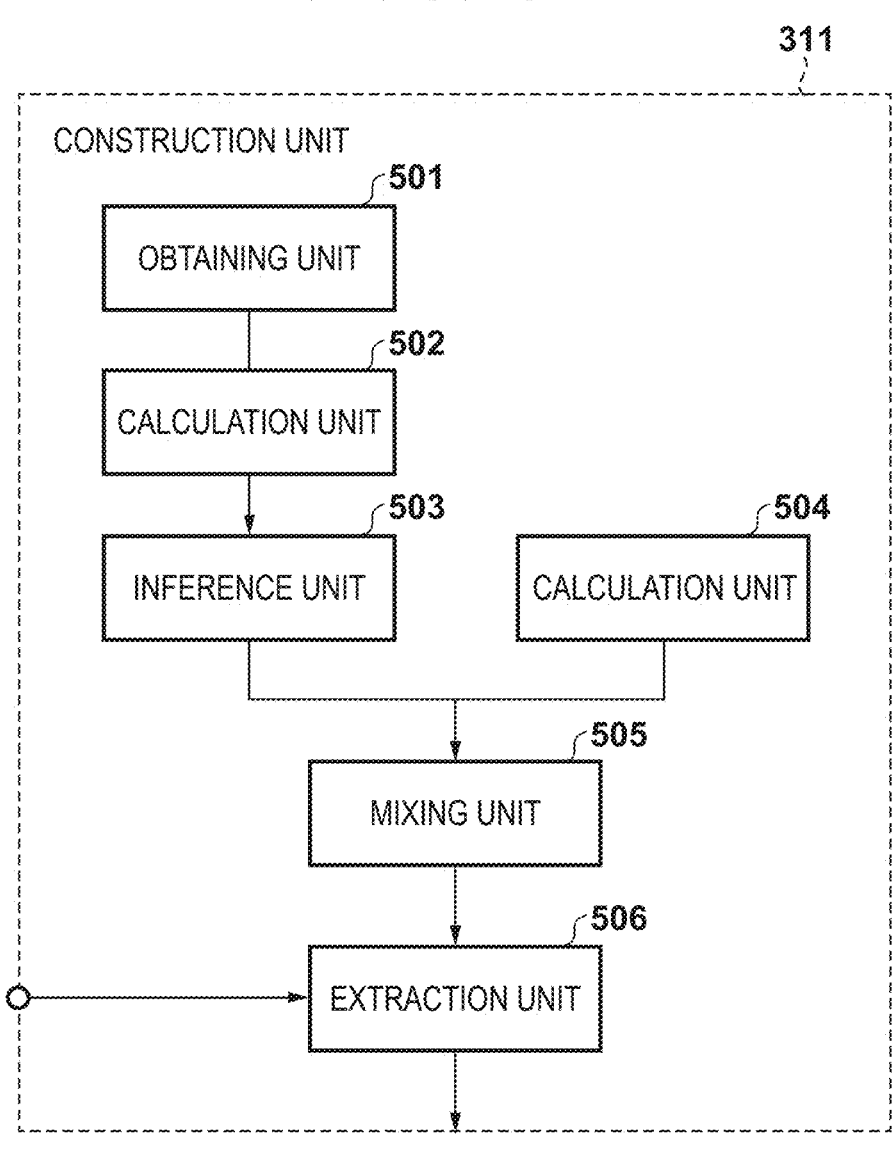

FIG. 6A

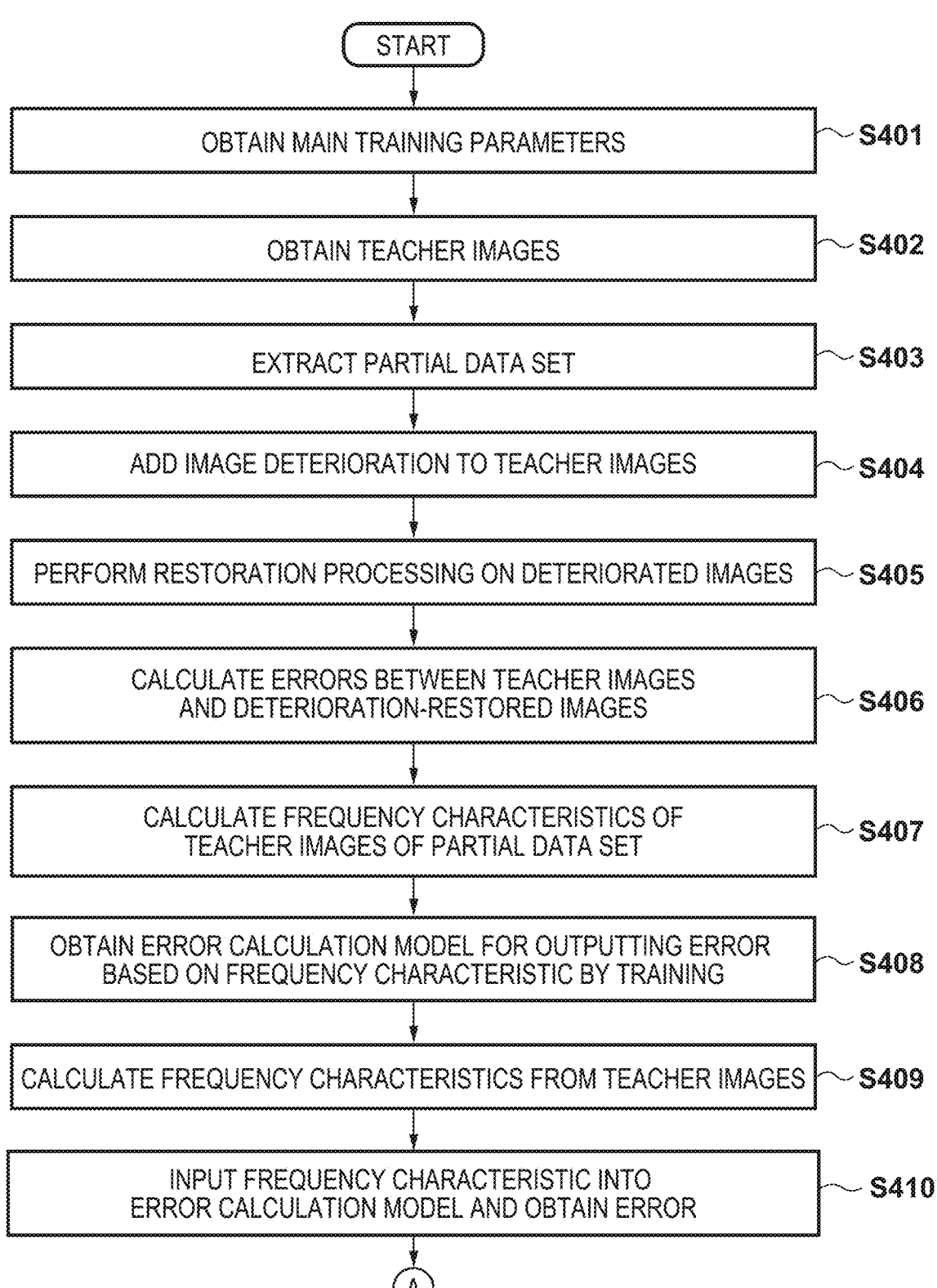

START

| | |
|---|---|
| OBTAIN MAIN TRAINING PARAMETERS | S401 |

| | |
|---|---|
| OBTAIN TEACHER IMAGES | S402 |

| | |
|---|---|
| EXTRACT PARTIAL DATA SET | S403 |

| | |
|---|---|
| ADD IMAGE DETERIORATION TO TEACHER IMAGES | S404 |

| | |
|---|---|
| PERFORM RESTORATION PROCESSING ON DETERIORATED IMAGES | S405 |

| | |
|---|---|
| CALCULATE ERRORS BETWEEN TEACHER IMAGES AND DETERIORATION-RESTORED IMAGES | S406 |

| | |
|---|---|
| CALCULATE FREQUENCY CHARACTERISTICS OF TEACHER IMAGES OF PARTIAL DATA SET | S407 |

| | |
|---|---|
| OBTAIN ERROR CALCULATION MODEL FOR OUTPUTTING ERROR BASED ON FREQUENCY CHARACTERISTIC BY TRAINING | S408 |

| | |
|---|---|
| CALCULATE FREQUENCY CHARACTERISTICS FROM TEACHER IMAGES | S409 |

| | |
|---|---|
| INPUT FREQUENCY CHARACTERISTIC INTO ERROR CALCULATION MODEL AND OBTAIN ERROR | S410 |

A

F I G. 6B
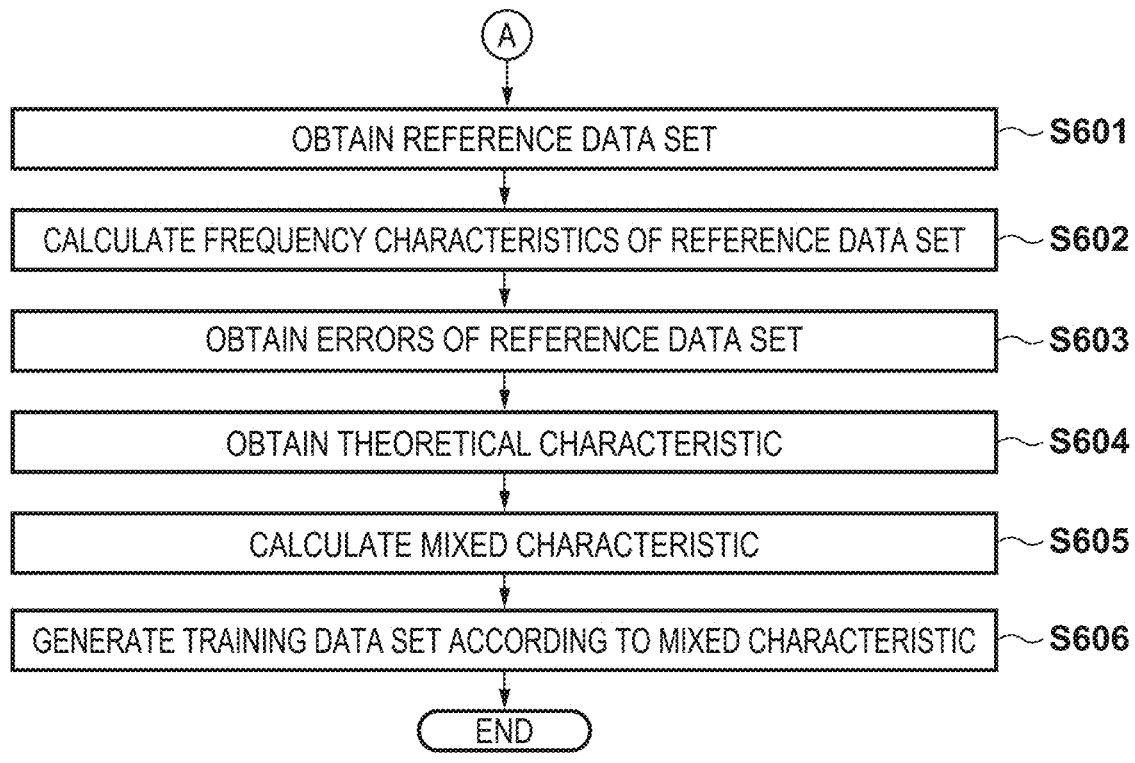

F I G.  7
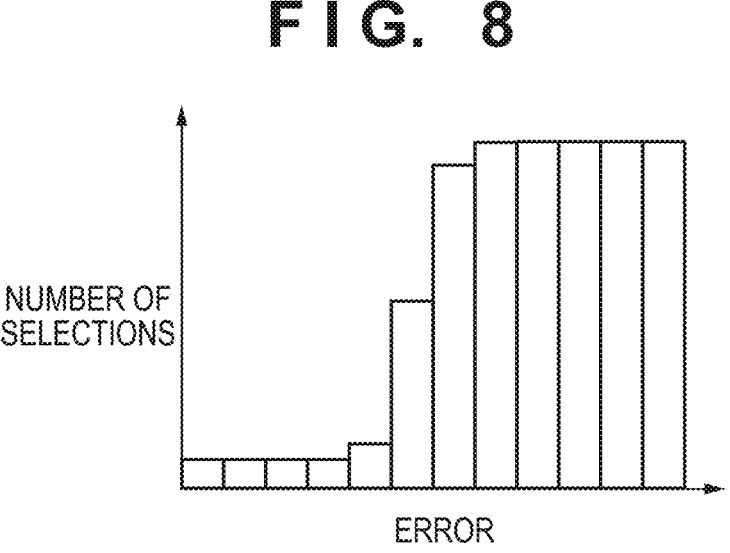
F I G.  8

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for restoring an image to a pre-deterioration state.

Description of the Related Art

In recent years, convolutional neural networks (CNNs) have been applied to many deterioration restoration software applications. Deterioration restoration specifically refers to processes for restoring a deteriorated image to an original image, such as noise removal, blur removal, super-resolution, and loss interpolation.

A large amount of training data is necessary for training in which a CNN for deterioration restoration is used. When training data is collected randomly, various kinds of images, such as photos of nature that include scenery and animals, such as photos of people such as portraits or sports photos, and photos of man-made objects such as architecture and products, can be obtained. However, since training data collected in this way contains many low-frequency components, it leads to reduced deterioration restoration performance. To cope with this problem, a method called "hard sample mining" in which hard patches, which contain many high-frequency components that are desirable for deterioration restoration, are collected to construct a data set is known (Wang, Shizun, et al. "SamplingAug: On the Importance of Patch Sampling Augmentation for Single Image Super-Resolution." arXiv preprint arXiv: 2111.15185 (2021)). The processing details are described below.

First, a deteriorated image is generated by adding a deterioration component to a teacher image. This corresponds to processing for simulating recapturing or regeneration of the teacher image in a condition in which deterioration will occur. Next, deterioration restoration processing is applied to the deteriorated image to generate a deterioration-restored image. Finally, an error between the teacher image and the deterioration-restored image is evaluated. The magnitude of this error is defined as difficulty.

To calculate the difficulty accurately, it is necessary to accurately reproduce image capturing processing performed in an image capturing device. This reproduction processing includes physical simulation, sensor simulation, and development processing. Thus, there is a problem that the calculation cost becomes enormous.

SUMMARY OF THE INVENTION

The present invention provides a technique for obtaining a restoration accuracy of processing for restoring an image to its pre-deterioration state with higher accuracy and at a lower cost.

According to the first aspect of the present invention, there is provided an image processing apparatus comprising: a first obtaining unit configured to obtain a restoration accuracy of processing for restoring a teacher image from a deteriorated image for which deterioration has been added to the teacher image; a second obtaining unit configured to obtain a frequency characteristic of the teacher image: and a first training unit configured to perform processing for training a learning model based on the restoration accuracy and the frequency characteristic.

According to the second aspect of the present invention, there is provided an image processing method comprising; obtaining a restoration accuracy of processing for restoring a teacher image from a deteriorated image for which deterioration has been added to the teacher image; obtaining a frequency characteristic of the teacher image: and performing processing for training a learning model based on the restoration accuracy and the frequency characteristic.

According to the third aspect of the present invention, there is provided a non-transitory computer-readable storage medium storing a computer program for causing a computer to function as: a first obtaining unit configured to obtain a restoration accuracy of processing for restoring a teacher image from a deteriorated image for which deterioration has been added to the teacher image; a second obtaining unit configured to obtain a frequency characteristic of the teacher image: and a first training unit configured to perform processing for training a learning model based on the restoration accuracy and the frequency characteristic.

Further features of the present invention will become apparent from the following description of exemplary embodiments with reference to the attached drawings.

BRIEF DESCRIPTION OF THE DRAWINGS

FIG. 1 is a block diagram illustrating an example of a configuration of an image processing system.

FIG. 4 is a flowchart of the operation of the image processing system.

FIG. 5 is a block diagram illustrating an example of a functional configuration of a construction unit 311.

FIG. 6A is a flowchart of the operation of the image processing system.

FIG. 6B is a flowchart of the operation of the image processing system.

FIG. 7 is a diagram illustrating an example of a histogram.

FIG. 8 is a diagram illustrating an example of a theoretical characteristic.

DESCRIPTION OF THE EMBODIMENTS

Figure 2:
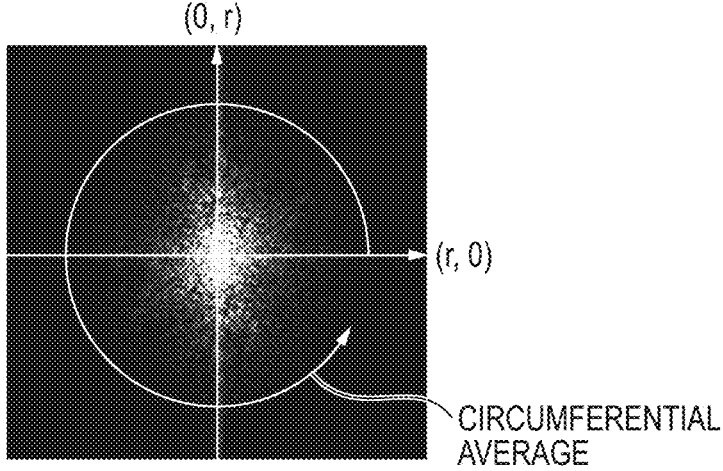
FIG. 2 is a diagram for explaining an overview of a power spectrum to be used at the time of calculating a frequency characteristic.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Regarding CNN>

First, a convolutional neural network (CNN), which is used in all image processing techniques to which deep learning is applied as well as in the following embodiments, will be described. A CNN is a technique in which processing in which a filter that has been generated by training (or learning) is convolved on an input image and then a non-linear operation is performed is repeated. The filter is also referred to as a local receptive field. An image obtained by performing a non-linear operation after convolving a filter on an input image is referred to as a feature map. Training is performed using training data (training images or data sets) constituted by pairs of an input image and an output image. Simply, training refers to generating values of a filter that can accurately transform an input image to a corresponding output image based on training data. Details thereof will be described later.

If an input image has RGB color channels or if a feature map is constituted by multiple images, a filter that is used for convolution will also have multiple channels accordingly. That is, a convolution filter is expressed by a four-dimensional array, which is constituted by a height and width size and the number of filters as well as the number of channels. Processing in which a filter is convolved on an image (or a feature map) and then a non-linear operation is performed is expressed in units of layers and is expressed as, for example, a feature map of an n-th layer or a filter of the n-th layer. In addition, a CNN that repeats convolution of a filter and a non-linear operation three times, for example, has a three-layer network structure. Such non-linear operation processing can be formulated as in the following Equation (1).

[EQUATION 1]

$$X_n^{(l)} = f\left(\sum_{n=1}^{N} W_n^{(l)} * X_{n-1}^{(l)} + b_n^{(l)}\right) \tag{1}$$

Here, in the above Equation (1), $W_n$ is the filter of the n-th layer ($1 \leq n \leq N$), $b_n$ is a bias of the n-th layer, f is a non-linear operator, $X_n$ is a feature map of the n-th layer, and * is a convolution operator. A superscript (l) indicates that it is a first filter or feature map. The filters and biases are generated by training, which will be described later, and are also collectively referred to as "network parameters". For example, a sigmoid function or a Rectified Linear Unit (ReLU) is used as the non-linear operation. For example, ReLU is given by the following Equation (2).

[EQUATION 2]

$$f(X) = \begin{cases} X \text{ if } 0 \leq X \\ 0 \text{ otherwise} \end{cases} \tag{2}$$

Here, as indicated in the above Equation (2), in ReLU, 0 is outputted as an output value for negative value components among components of an inputted vector X, and a value of the component is outputted as an output value for positive value components among the components of the inputted vector X.

ResNet from the field of image recognition and RED-net, which is an application of the ResNet, from the field of super-resolution are well known as networks in which a CNN is used. In both cases, the CNN is multi-layered, and filter convolution is performed many times to improve processing accuracy. For example, ResNet is characterized by a network structure in which paths that take a shortcut around convolutional layers are provided and thus realizes a multilayer network that has as many as 152 layers and high-accuracy recognition that approaches a human recognition rate. Simply put, the reason why processing improves in accuracy due to a multilayer CNN is because a non-linear relationship between input and output can be expressed by repeating a non-linear operation many times.

<Training of CNN>

Next, training of a CNN will be described. A CNN is generally trained by minimizing an objective function expressed by the following Equation (3) using pairs (training data) of an input training image (student image) and an output training image (teacher image) that corresponds to the input learning image.

[EQUATION 3]

$$L(\theta) = \frac{1}{n} \sum_{i=1}^{n} \|F(X_i; \theta) - Y_i\|_2^2 \tag{3}$$

Here, in the above Equation (3), L is a loss function for measuring an error between a correct solution and an inference thereof. $Y_i$ is an i-th output training image and $X_i$ is an i-th input training image. Further, F is a function that collectively represents an operation (Equation (1)) performed in each layer of the CNN. In addition, $\theta$ is network parameters (a filter and a bias). $\|Z\|_2$ is an L2 norm and, simply put, is a square root of the sum of squares of components of a vector Z. In addition, n is the total number of pieces of training data used for training. Since the number of pieces of training data is generally large, in stochastic gradient descent (SGD), images are randomly selected from the training images and used for training. This makes it possible to reduce computational load in training. In addition, various methods, such as a momentum method, an AdaGrad method, an AdaDelta method, and an Adam method are known as methods of minimizing (optimizing) the objective function. The Adam method is given by Equation (4) below.

[EQUATION 4]

$$g = \frac{\partial L}{\partial \theta_i^t} \tag{4}$$
$$m = \beta_1 m + (1 - \beta_1)g$$
$$v = \beta_2 v + (1 - \beta_2)g^2$$
$$\theta_i^{t+1} = \theta_i^t - \alpha \frac{\sqrt{1 - \beta_2^t}}{(1 - \beta_1)} \frac{m}{\left(\sqrt{v} + \in \varepsilon\right)}$$

In the above Equation (4), $$\theta_i^t$$

is an i-th network parameter in a t-th iteration, g is a slope of the loss function L related to $$\theta_i^t.$$

In addition, m and v are moment vectors, $\alpha$ is a base learning rate, $\beta 1$ and $\beta 2$ are hyperparameters, and $\varepsilon$ is a small constant. In addition, since there is no guideline for selecting a method of optimization in training, basically, any method may be used; however, it is known that since there is a difference in convergence for each method, there will be a difference in training time.

First Embodiment

In the present embodiment, a method for inferring a restoration accuracy (difficulty) of processing for restoring a deteriorated (image-deteriorated) image to a pre-deterioration image and, based on a result of that inference, generating a data set (training data set) to be used in training a "learning model for inferring a pre-deterioration image from a deteriorated image" will be described. The learning model includes, for example, learned parameters of the learning model and information representing a network structure of the learning model.

"Difficulty" according to the present embodiment is calculated based on an input image and a deteriorated image for which deterioration has been added to the input image. Since a conventional method includes a procedure of adding high-cost image deterioration for which image capturing processing in a camera has been reproduced, a calculation cost of difficulty calculation becomes enormous. In contrast, in a method according to the present embodiment, difficulty is calculated using a model that has been trained to output a difficulty that corresponds to a frequency characteristic of an input image, and so, the calculation cost of difficulty calculation can be reduced as compared with the conventional method. In the present embodiment, "resolution reduction" will be described as an example of "deterioration".

First, an example of a configuration of an image processing system according to the present embodiment will be described with reference to a block diagram of FIG. 1. As illustrated in FIG. 1, the image processing system according to the present embodiment includes a cloud server 200 and an edge device 100 and is configured such that data communication can be performed between the cloud server 200 and the edge device 100 via the Internet.

First, the cloud server 200 will be described. The cloud server 200 generates a data set (training data set) to be used for training a learning model for inferring a pre-deterioration image from a deteriorated image and performs processing for training the learning model using the generated training data set. Then, the cloud server 200 provides the trained learning model to the edge device 100 in response to a request from the edge device 100.

A CPU 201 executes various processes using computer programs and data stored in a RAM 203. The CPU 201 thus controls the operation of the entire cloud server 200 and executes or controls various processes that are described as processes to be performed by the cloud server 200.

A ROM 202 stores setting data of the cloud server 200, computer programs and data for starting the cloud server 200, computer programs and data for basic operations of the cloud server 200, and the like.

The RAM 203 includes areas for storing computer programs and data loaded from the ROM 202 or a mass storage device 204. The RAM 203 also includes an area for storing computer programs and data received from the edge device 100 via a network I/F 205. The RAM 203 also includes a work area that the CPU 201 uses when executing various processes. The RAM 203 can thus provide various areas as appropriate.

The mass storage device 204 is a mass information storage device, such as a hard disk drive device or an SSD. The mass storage device 204 stores an operating system (OS), computer programs, data, and the like for causing the CPU 201 to execute or control various processes that are described as processes to be performed by the cloud server 200. The computer programs and data stored in the mass storage device 204 are loaded into the RAM 203 as appropriate according to control by the CPU 201 and become processing targets of the CPU 201.

The network I/F 205 is an interface for performing data communication with the edge device 100 via the Internet. The CPU 201, the ROM 202, the RAM 203, the mass storage device 204, and the network I/F 205 are all connected to a system bus 206.

Next, the edge device 100 will be described. The edge device 100 obtains the learning model provided from the cloud server 200 and obtains output of the learning model to which an input image has been inputted as a pre-deterioration image of the input image.

A CPU 101 executes various processes using computer programs and data stored in a RAM 102. The CPU 101 thus controls the operation of the entire edge device 100 and executes or controls various processes that are described as processes to be performed by the edge device 100.

The RAM 102 includes areas for storing computer programs and data loaded from a ROM 103, a mass storage device 104, or an external storage device 30. The RAM 102 also includes an area for storing computer programs and data received from the cloud server 200 via a network I/F 106 and an area for storing a captured image received from an image capturing device 10 via a general-purpose I/F 105. The RAM 102 also includes a work area that the CPU 101 uses when executing various processes. The RAM 102 can thus provide various areas as appropriate.

The ROM 103 stores setting data of the edge device 100, computer programs and data for starting the edge device 100, computer programs and data for basic operations of the edge device 100, and the like.

The mass storage device 104 is a mass information storage device, such as a hard disk drive device or an SSD. The mass storage device 104 stores an operating system (OS), computer programs, data, and the like for causing the CPU 101 to execute or control various processes that are described as processes to be performed by the edge device 100. The computer programs and data stored in the mass storage device 104 are loaded into the RAM 102 as appropriate according to control by the CPU 101 and become processing targets of the CPU 101.

The network I/F 106 is an interface for performing data communication with the cloud server 200 via the Internet. The general-purpose I/F 105 is, for example, a serial bus interface, such as USB, IEEE 1394, or HDMI®. The image capturing device 10, an input device 20, the external storage device 30, a display device 40 are connected to the general-purpose I/F 105.

The image capturing device 10 is a device capable of capturing a moving image or a still image. For example, the image capturing device 10 outputs images of respective frames of a moving image as captured images. Further, for example, the image capturing device 10 outputs periodically or irregularly-captured still images as captured images.

The input device 20 is a user interface, such as a keyboard, a mouse, and a touch panel, and various kinds of information and instructions can be inputted to the edge device 100 by user operation.

The external storage device 30 is a variety of storage media, such as a memory card, a CF card, an SD card, and a USB memory, and may store some of the computer programs and data that are described as being stored in the mass storage device 104. The computer programs and data stored in the external storage device 30 are loaded into the RAM 103 as appropriate according to control by the CPU 101 and become processing targets of the CPU 101.

The display device 40 includes a liquid crystal screen or a touch panel screen and displays a result of processing by the CPU 101 using images, text, and the like. The display device 40 may be a projection device, such as a projector for projecting images and text. The CPU 101, the RAM 102, the ROM 103, the mass storage device 104, the general-purpose I/F 105, and the network I/F 106 are all connected to a system bus 107.

The configurations of the cloud server 200 and the edge device 100 illustrated in FIG. 1 are only one example and do not intend to limit the present invention to the configuration. The configuration of the image processing system according to the present embodiment is not limited to the configuration illustrated in FIG. 1. For example, the functions of the cloud server 200 may be realized by processing by a plurality of computer devices.

Further, the functions of the cloud server 200 and/or the edge device 100 may be incorporated in the image capturing device 10, and processing for generating a training data set, processing for training a learning model, processing for obtaining output of a learning model to which a captured image has been inputted as a pre-deterioration image of the captured image, and the like may be performed in the image capturing device 10.

Figure 3:
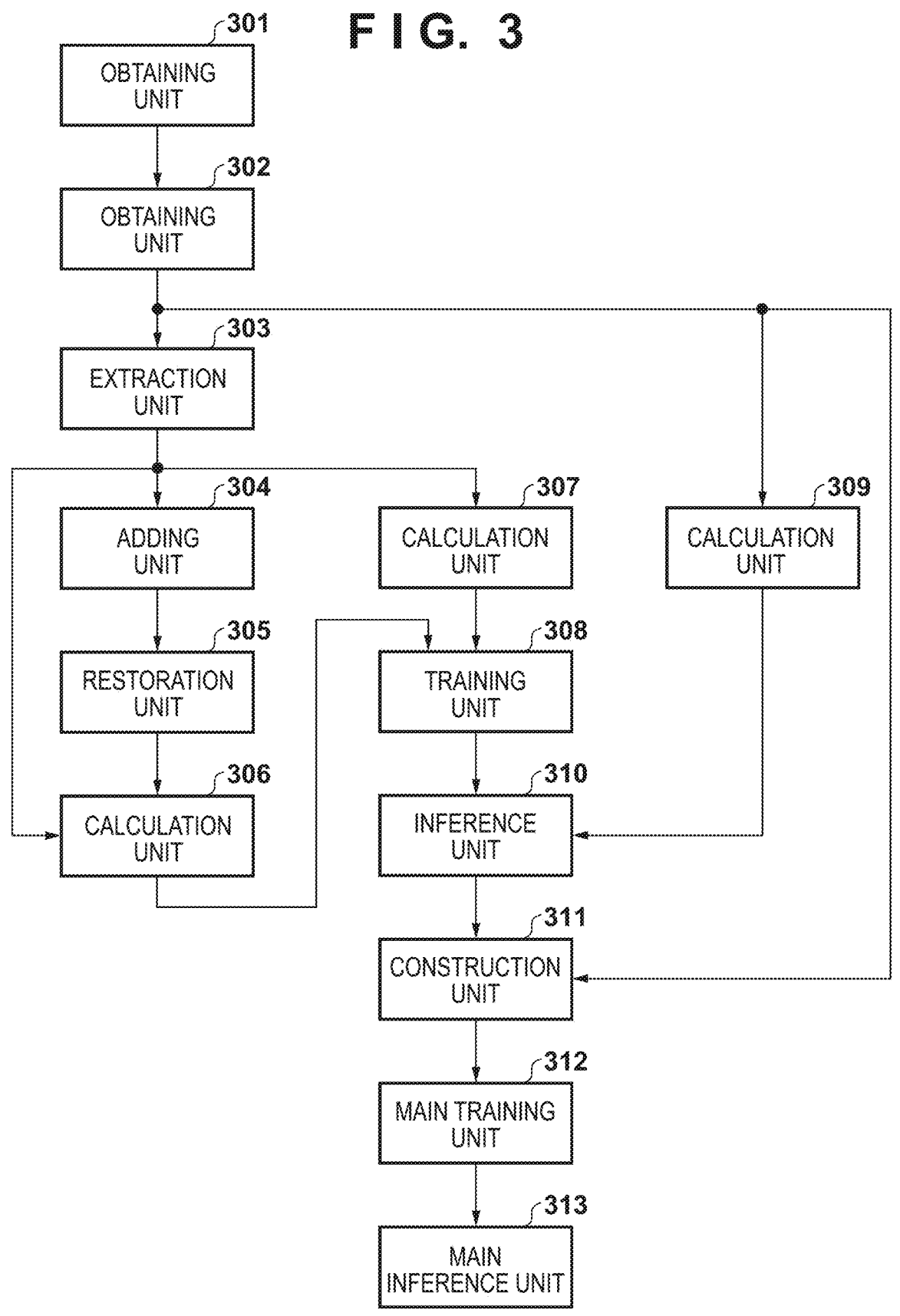
FIG. 3 is a block diagram illustrating an example of a functional configuration of the image processing system.

Next, an example of a functional configuration of the image processing system according to the present embodiment is illustrated in a block diagram of FIG. 3. Among the functional units illustrated in FIG. 3, functional units other than a main inference unit 313 are functional units held in the cloud server 200, and the main inference unit 313 is a functional unit held in the edge device 100.

In the present embodiment, a case in which each functional unit illustrated in FIG. 3 is implemented by software (a computer program) will be described. In addition, in the following, each functional unit illustrated in FIG. 3 may be described as a performer of processing. In practice, however, functions of functional units other than the main inference unit 313 are realized by the CPU 201 executing a computer program that corresponds to that functional unit, and functions of the main inference unit 313 are realized by the CPU 101 executing a computer program that corresponds to the main inference unit 313. One or more of the functional units illustrated in FIG. 3 may be implemented by hardware.

The operation of an image processing system according to the present embodiment will be described according to a flowchart of FIG. 4. In the following, resolution reduction is taken up as an example of deterioration, and an example in which super resolution processing for restoring an image to its original state before the resolution reduction is inferred will be described.

In step S401, an obtaining unit 301 obtains main training parameters into the RAM 203. Main training refers to performing super-resolution training using a training data set generated by processing to be described below. In super-resolution training, a deteriorated image for which resolution deterioration has been added to a teacher image is generated, and training is performed so as to restore the deteriorated image to the teacher image, which is a deterioration source of the deteriorated image. The main training parameters include a "deterioration kernel", an "image reduction rate" and a "training patch size" to be used in the learning.

The obtaining unit 301 may obtain the main training parameters from the mass storage device 204 or from an external device via the network I/F 205, and a source from which the main training parameters are obtained is not limited to a particular source of obtainment.

In step S402, an obtaining unit 302 obtains an input image. The obtaining unit 302 may obtain a captured image outputted from the image capturing device 10 as the input image or obtain the input image stored in advance in the mass storage device 204, and a source from which the input image is obtained is not limited to a particular source of obtainment.

The obtaining unit 302 divides the obtained input image into a plurality of patches, each having the "training patch size", and obtains the patches as teacher images. That is, the obtaining unit 302 obtains a plurality of teacher images (the size of each teacher image is the "training patch size" included in the main training parameters) from the input image. The input image does not need to be divided into patches, and the input image itself may be set as a teacher image.

In step S403, an extraction unit 303 selects some of the teacher images among the plurality of teacher images obtained by the obtaining unit 302 as selected teacher images and constructs a set of the selected teacher images as a partial data set. The selection of the selected teacher images from the plurality of teacher images obtained by the obtaining unit 302 is not limited to a specific selection method, and for example, the selected teacher images may be selected randomly or according to some criteria.

In step S404, an adding unit 304 generates a deteriorated image to which deterioration has been added to the selected teacher image for each selected teacher image included in the partial data set. For example, the adding unit 304 adds deterioration to the selected teacher image by convolving a deterioration kernel that reproduces a drop in high frequency components in a lens of the image capturing device 10 on the selected teacher image and then applying image reduction that reproduces light collection in a sensor of the image capturing device 10 on the selected teacher image.

A method of convolving the deterioration kernel and then adding deterioration will be described below. Assume that an image that has been captured using an ideal optical system that does not cause deterioration is f. Here, f (x, y) represents a pixel value of a pixel at a pixel position (x, y) in the image f. Meanwhile, assume that an image captured by an optical system that causes deterioration is g. Here, g (x, y) represents a pixel value of a pixel at a pixel position (x, y) in the image g. Assume that the deterioration kernel is h. The deterioration kernel h is determined from image capturing conditions, such as a lens type, a camera type, an aperture, a focal length, and a subject distance. Here, h(x, y) represents a value of the deterioration kernel that corresponds to a pixel position (x, y). Among f(x, y), g(x, y), and h(x, y), a relationship of the following Equation (5) holds true.

[EQUATION 5]

$$g(x,y)=h(x,y)*f(x,y) \tag{5}$$

Image reduction is realized by a given pixel reduction. For example, if the "image reduction rate" included in the main training parameters is one-fourth, reduction is performed at four-pixel intervals. An image reduction method is not limited to a specific method.

In step S405, a restoration unit 305 generates a result of having performed "processing for restoring the deteriorated image to a pre-deterioration image" on the deteriorated image as a deterioration-restored image for each deteriorated image generated by the adding unit 304. For example, a super-resolution network that has learned restoration processing is used for the restoration processing. A super-resolution network that has been generated based on a CNN is used. In addition to this, for example, a linear interpolation algorithm, such as Bicubic method, may be applied for the restoration processing.

In step S406, a calculation unit 306 obtains a difference (error) between the selected teacher image and a deterioration-restored image that corresponds to that selected teacher image for each selected teacher image included in the partial data set using the following Equation (6).

[EQUATION 6]

$$d = MSE(HR, SR) \tag{6}$$

Here, d is the error, and MSE(A, B) is a mean squared error between an image A and an image B, HR is the selected teacher image, and SR is the deterioration-restored image that corresponds to the selected teacher image. Other image quality evaluation indices, such as a peak-signal-to-noise ratio (PSNR) and an L1 loss may be used instead of MSE.

In step S407, a calculation unit 307 obtains a frequency characteristic of each selected teacher image included in the partial data set. First, the calculation unit 307 obtains a modulation transfer function (MTF) using the following Equation (7).

[EQUATION 7]

$$MTF(r) = \frac{1}{2\pi} \int_0^{2\pi} g(r\cos\theta, r\sin\theta) d\theta \tag{7}$$

Here g(x, y) is an intensity at coordinates (x, y) on a power spectrum of the selected teacher image, and r is a distance from the center of the power spectrum to an edge. Equation (7) represents an operation of circumferentially averaging the power spectrum and then integrating one interval for which a region has been divided in advance into a given number of intervals in a direction from the center to the edge. A conceptual diagram thereof is illustrated in FIG. 2. Here, a high-frequency component amount increases in a direction from the center to the edge. The equation for calculating the MTF is not limited to the aforementioned Equation (7), and another calculation method may be used so long as an evaluation value correlates with a negative effect generation amount. Then, the calculation unit 307 obtains a vector p whose component is a value for which the MTF has been integrated for each interval as a frequency characteristic using the following Equation (8).

[EQUATION 8]

$$p = \left\{ \int_{ct}^{c(t+1)} MTF(r) dr \right\}_{t=0}^{N} \tag{8}$$

Here, c is an interval width and N is the number of intervals. As indicated in the following Equation (9), the vector p may be calculated with an interval from a bin number a, which corresponds to a frequency at which an intensity of the MTF calculated from the deteriorated image is less than or equal to a given threshold, to a bin number b, which corresponds to a frequency at which an intensity of the MTF calculated from the teacher image is less than or equal to a given threshold, as an integral interval.

[EQUATION 9]

$$p = \left\{ \int_{ct}^{c(t+1)} MTF(r) dr \right\}_{t=a}^{b} \tag{9}$$

The bin number a may be obtained based on an image reduction ratio. For example, if the image reduction rate is ¼, the lower limit bin number a will also be ¼ of the number of intervals N. In step S408, a training unit 308 performs processing (processing for training an error calculation model) in which parameters (such as weight coefficients) of the error calculation model are updated such that output of the error calculation model to which a frequency characteristic of a selected teacher image has been inputted will be the error obtained in step S406 for that selected teacher image. For example, a multilayer perceptron is used for the error calculation model; however, the present invention is not limited thereto, and another calculation model, such as another type of neural network or linear regression equation, may be used.

As described above, in the present embodiment, an error calculation model is trained using some of the teacher images instead of all of the teacher images obtained from an input image. Thus, in the present embodiment, the error calculation model can be trained at a higher speed than when the error calculation model is trained using all of the teacher images obtained from an input image.

In step S409, a calculation unit 309 obtains a frequency characteristic of each of the plurality of teacher images obtained by the obtaining unit 302 in the same manner as the calculation unit 307. In step S410, an inference unit 310 obtains output (an error) of the error calculation model into which the frequency characteristic of the teacher image has been inputted for each of the plurality of teacher images obtained by the obtaining unit 302.

In step S411, a construction unit 311 identifies (selects) teacher images for which the error (that is, the above-described difficulty) obtained in step S410 is greater than or equal to a threshold as main training teacher images from the plurality of teacher images obtained by the obtaining unit 302. That is, the construction unit 311 identifies teacher images for which the accuracy of restoration from a deteriorated image is greater than or equal to a threshold as main training teacher images from the plurality of teacher images obtained by the obtaining unit 302. Then, the construction unit 311 generates deteriorated images for which deterioration has been added to the main training teacher images in the same manner as in step S404 and constructs pairs of the main training teacher image and the deteriorated image generated for the main training teacher images as a training data set.

In step S412, a main training unit 312 performs processing for training a deterioration restoration model using the training data set. That is, the main training unit 312 performs processing (processing for training the deterioration restoration model) in which parameters (such as weight coefficients) of the deterioration restoration model are updated such that output of the deterioration restoration model to which a deteriorated image included in the training data set is inputted will be a main training teacher image that corresponds to that deteriorated image. For example, a CNN is used for the deterioration restoration model; however, the present invention is not limited thereto, and another calculation model, such as another type of neural network or linear regression equation, may be used.

In step S413, the main inference unit 313 obtains the deterioration restoration model generated by the cloud server 200. The main inference unit 313 obtains a processing target image into the RAM 102. The main inference unit 313 may obtain a captured image outputted from the image capturing device 10 as the processing target image or obtain an image stored in the mass storage device 204 as the processing target image. The main inference unit 313 may obtain the processing target image from an external device (such as the cloud server 200) via the Internet. As described above, a source from which the processing target image is obtained is not limited to a particular source of obtainment.

The main inference unit 313 then obtains output of the deterioration restoration model to which the processing target image has been inputted as a pre-deterioration image of the processing target image (in the case of the present embodiment, an image that has been subjected to super-resolution processing) and outputs the obtained image. A destination to which the image is outputted by the main inference unit 313 is not limited to a particular output destination. For example, the main inference unit 313 may display the obtained image on the display device 40, store the obtained image in the mass storage device 104 or the external storage device 30, or may transmit the obtained image to an external device via the Internet.

The following operation example is conceivable as an example of operation of such an image processing system. When the user inputs an instruction for super-resolution processing by operating a web browser installed on the edge device 100 using the input device 20, the web browser (edge device 100) transmits a request for obtaining the deterioration restoration model to the cloud server 200. Upon receiving the obtainment request, the cloud server 200 transmits a trained deterioration restoration model to the edge device 100. The edge device 100 performs super-resolution processing using the deterioration restoration model received from the cloud server 200 and displays a result of the super-resolution processing on a screen of the web browser.

Variation

The configuration illustrated in FIG. 3 is an example and can be modified or changed as appropriate. For example, one functional unit may be divided into a plurality of functional units, or two or more functional units may be integrated into one functional unit.

Further, in the present embodiment, a case where the resolution reduction is applied has been described as an example of the deterioration; however, the present invention is not limited thereto, and typical image deterioration, such as blurring, noise, compression, color thinning, fog/haze/rain/snow, aberration, and defect can be applied.

Further, in the present embodiment, training is performed from scratch using a group of teacher images prepared in advance. However, processing of the present embodiment may be performed based on trained network parameters.

Further, in the present embodiment, a partial data set is formed by selecting teacher images at random from a group of teacher images in the extraction unit 303. However, the extraction unit 303 may construct a partial data set by selecting teacher images from the group of teacher images such that an "average of frequency characteristics" coincides between the group of teacher images and the partial data set.

The partial data set may be extracted such that an average of frequency characteristics of all of the images of the partial data set roughly coincides with an average of frequency characteristics of a group of input images. Specifically, the average of frequency characteristics is calculated for a randomly selected partial data set. Then, a given number of images that have a frequency that the partial data set is lacking when its average is compared with the average of frequency characteristics of the group of input images are extracted from the group of teacher images and added to the partial data set. This procedure is repeated until there are no more insufficient frequencies.

Second Embodiment

In the following embodiments, which include the present embodiment, and variations, differences from the first embodiment will be described, and unless otherwise mentioned below, it is assumed that the embodiments and variations are similar to the first embodiment. In the first embodiment, an embodiment in which when constructing a training data set, the calculation cost of difficulty calculation is reduced by using the error calculation model that has learned the process of difficulty calculation has been described.

In the present embodiment, a method of constructing a training data set so as to include many high-frequency components that are considered desirable for super-resolution will be described. Specifically, teacher images and corresponding deteriorated images to be included in the training data set are selected so as to follow a particular difficulty distribution suitable for super-resolution training. This makes it possible to perform super-resolution training with high sharpness and less artifacts. This omits the process of adding high-cost deterioration for which image capturing processing in a camera has been reproduced, similarly to the first embodiment, and so, low-cost calculation can be realized as compared with the conventional method.

An example of a functional configuration of the construction unit 311 according to the present embodiment is illustrated in a block diagram of FIG. 5. The operation of the image processing system according to the present embodiment will be described below according to a flowchart of FIG. 6A and FIG. 6B. In FIG. 6A and FIG. 6B, the processing steps that are the same as the processing steps illustrated in FIG. 4 are denoted by the same step numbers, and the description for those processing steps will be omitted.

In step S601, an obtaining unit 501 obtains a reference data set, which includes a plurality of reference images, into the RAM 203. A reference image is an image that contains many high-frequency components, which are desirable for super-resolution training. The obtaining unit 501 may obtain the reference data set from the mass storage device 204 or from an external device via the network I/F 205. The obtaining unit 501 may obtain a set of images captured by the image capturing device 10 as the reference data set. As described above, a source from which the reference data set is obtained is not limited to a particular source of obtainment.

In step S602, a calculation unit 502 obtains a frequency characteristic of each reference image included in the reference data set in the same manner as the calculation unit 307. In step S603, an inference unit 503 obtains output (an error) of the "error calculation model generated by the training unit 308" into which the frequency characteristic of the reference image has been inputted for each reference image included in the reference data set, similarly to the inference unit 310.

Then, the inference unit 503 generates a histogram of errors obtained for respective reference images included in the reference data set as a reference characteristic. An example of a histogram generated by the inference unit 503 is illustrated in FIG. 7. In FIG. 7, a horizontal axis represents error (bin) and a vertical axis represents frequency. The histogram of FIG. 7 is a histogram with less low-frequency components and more high-frequency components compared to a histogram obtained from randomly collected images.

In step S604, an obtaining unit 504 obtains a theoretical characteristic. The theoretical characteristic is a histogram in which the number of selections increases as the teacher images increase in error (increase in difficulty). An example of the theoretical characteristic is illustrated in FIG. 8. In FIG. 8, a horizontal axis represents error (bin) and a vertical axis represents the number of selections. As illustrated in FIG. 8, the histogram is configured such that low-frequency components are selected (obtained) at a minimum and high-frequency components are selected (obtained) at a maximum. Here, it is assumed that the number of bins in the reference characteristic and the number of bins in the theoretical characteristic are the same (=Nb).

In step S605, a mixing unit 505 obtains a mixed characteristic using the reference characteristic and the theoretical characteristic. Assuming that i(x) is a frequency that corresponds to an x-th bin (error) in the reference characteristic and j(x) is the number of selections that corresponds to the x-th bin (error) in the theoretical characteristic, the mixing unit 505 obtains a mixed characteristic k(x) using the following Equation (10).

[EQUATION 10]

$$k(x) = \frac{i(x)j(x)}{\int i(x)j(x)dx} \tag{10}$$

Figure 9:
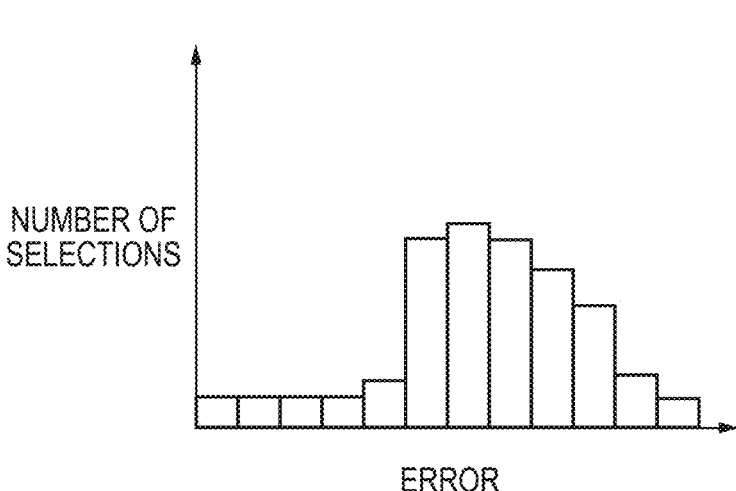
FIG. 9 is a diagram illustrating an example of a mixed characteristic.

Here, the mixed characteristic k(x) represents the number of selections that corresponds to the x-th bin (error). An example of the mixed characteristic is illustrated in FIG. 9. In FIG. 9, a horizontal axis represents x and a vertical axis represents k(x). Regarding the histogram, low-frequency components are obtained based on the theoretical characteristic and high-frequency components are obtained based on the reference characteristic.

Although Equation (10) indicates an example of mixing the reference characteristic and the theoretical characteristic by multiplying the reference characteristic and the theoretical characteristic, a method of mixing the reference characteristic and theoretical characteristic is not limited thereto. For example, the mixing unit 505 may mix the reference characteristic and the theoretical characteristic by adding the reference characteristic and the theoretical characteristic or mix the reference characteristic and the theoretical characteristic by obtaining a weighted average of the reference characteristic and the theoretical characteristic.

In step S606, an extraction unit 506 obtains a plurality of teacher images obtained by the obtaining unit 302, errors each obtained by the inference unit 310 for respective one of the plurality of teacher images, and a mixed characteristic obtained by the mixing unit 505. The extraction unit 506 then equally divides an interval between a maximum error and a minimum error among the errors obtained by the inference unit 310 into Nb subintervals. The extraction unit 506 selects k(x) teacher images from teacher images that correspond to the errors belonging to an x (1≤x≤Nb)-th sub-interval among the plurality of teacher images obtained by the obtaining unit 302 and includes the selected teacher images and the deteriorated images that correspond to the teacher images in the training data set. A method of selecting k(x) teacher images from the teacher images that correspond to the errors belonging to the x-th sub-interval is not limited to a specific method, and the k(x) teacher images may be selected randomly or may be selected according to some criteria.

As described above, according to the present embodiment, it is possible to construct a training data set that roughly coincides with a distribution of reference characteristics or theoretical characteristics that include many high-frequency components and are considered desirable for super-resolution and thereby perform super-resolution training that has a higher sharpness and less artifacts than the first embodiment.

In addition, since it is not necessary to add deterioration or perform restoration processing on the reference data set, the process of adding high-cost deterioration for which image capturing processing in a camera has been reproduced, such as in the conventional method, is omitted. Therefore, low-cost calculation can be realized as compared with the conventional method.

In the present embodiment, the histograms are generated by the cloud server 200; however, the user may manually generate the histograms by operating an operation unit (not illustrated), or the histograms may be received from an external device via the network I/F 205.

Further, the data set may be constructed so as to roughly coincide with the reference characteristic or theoretical characteristic rather than the mixed characteristic. For example, the extraction unit 506 may select i(x) teacher images from teacher images that correspond to the errors belonging to an x-th sub-interval among the plurality of teacher images obtained by the obtaining unit 302 and include the selected teacher images and the deteriorated images that correspond to the teacher images in the training data set. For example, the extraction unit 506 may select j(x) teacher images from teacher images that correspond to the errors belonging to an x-th sub-interval among the plurality of teacher images obtained by the obtaining unit 302 and include the selected teacher images and the deteriorated images that correspond to the teacher images in the training data set.

In the present embodiment, a characteristic of the data set is set to be a histogram of difficulty. However, the characteristic may be other data so long as it represents a statistical amount of difficulty of the data set.

Variation

Figure 10:
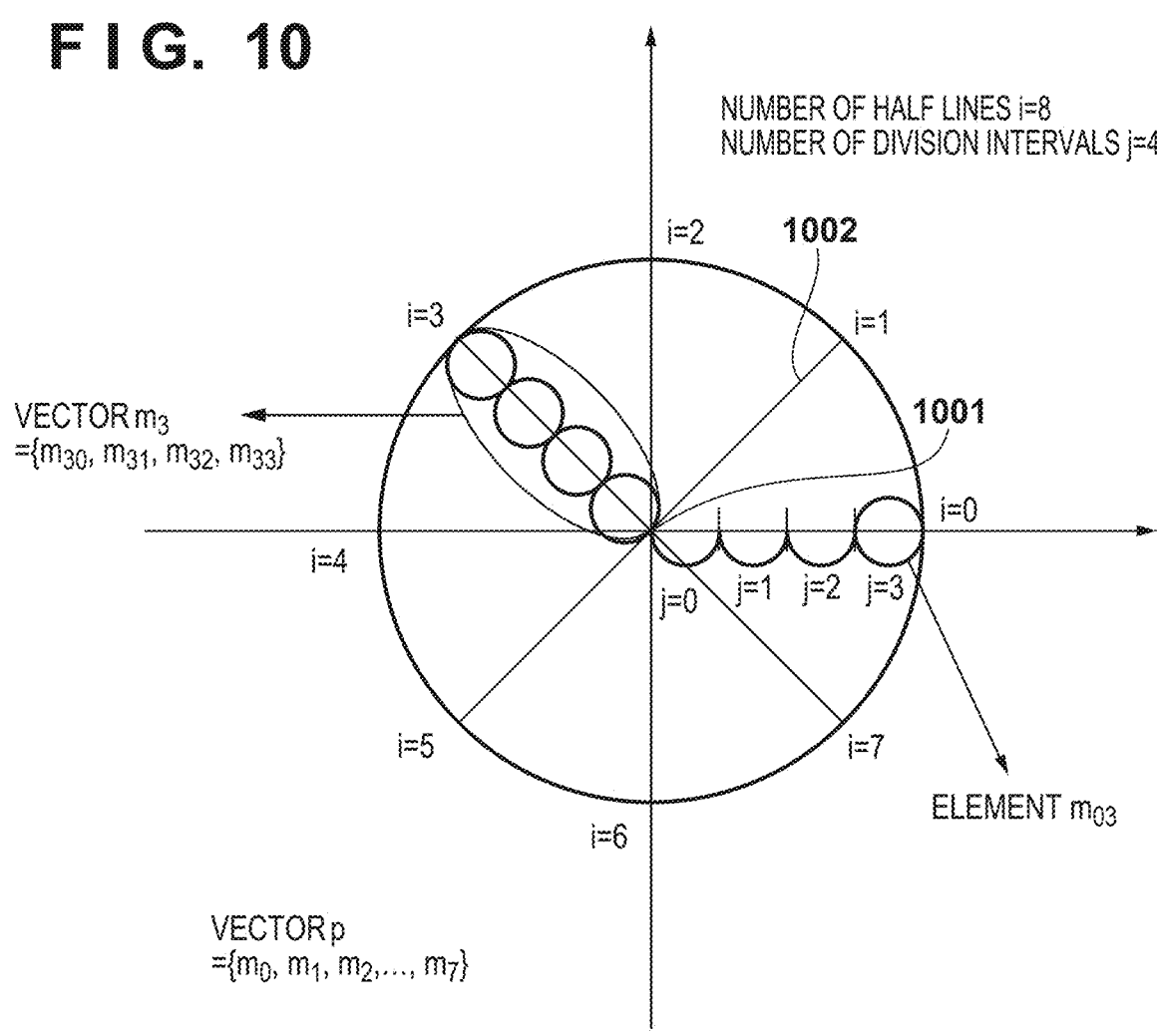
FIG. 10 is a diagram illustrating a specific example of a variation of a second embodiment.

In the first embodiment and the second embodiment, the calculation unit 307 obtains a frequency characteristic by a method of circumferentially averaging the power spectrum and then integrating one interval of a region divided into a given number of intervals in a direction from the center to the edge; however, the frequency characteristic may be obtained for each direction. A concrete example is illustrated in FIG. 10. The calculation method of the frequency characteristic described below is used in the calculation unit 307.

First, multi-directional half lines 1002 that pass through a center 1001 of the power spectrum are set. The half lines 1002 need not pass through the center. Further, the half lines 1002 may be straight lines or a curve.

Next, the half lines 1002 are divided into a plurality of intervals, and an average of power spectrum values in each interval is calculated, and a vector p whose elements are constituted by these is obtained. Equation (11) for obtaining the vector p is illustrated.

15

16

[EQUATION 11]

$$m_i = \{m_{ij}\}_{i=0}^{M} \tag{11}$$
$$p = \{m_i\}_{i=0}^{N}$$

Here, $m_{ij}$ is an average power spectrum value of a j-th interval in the half line 1002 in an i-th direction, M is the number of elements in each section, and N is the number of intervals. The values around each interval may be included in the average. Instead of the power spectrum, a differential image of the teacher image may be used. In this case, the vector p having a differential value for each direction as an element is calculated.

The numerical values, processing timings, processing orders, processing entities, data (information) obtainment methods, destinations, sources, storage locations, and the like used in each of the above-described embodiments and variations have been given as examples for the sake of a concrete explanation and does not intend to limit the present invention to such examples.

Further, some or all of the above-described embodiments and variations may be used in combination as appropriate. Further, some or all of the above-described embodiments and variations may be selectively used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195860, filed Dec. 7, 2022, which is hereby incorporated by reference herein in its entirety.

What is claimed is:

1. An image processing apparatus comprising:
   one or more processors and a memory, which are configured to function as a plurality of units comprising:
   (1) a first obtaining unit configured to obtain a restoration accuracy of processing for restoring a teacher image from a deteriorated image for which deterioration has been added to the teacher image;
   (2) a second obtaining unit configured to obtain a frequency characteristic of the teacher image;
   (3) a first training unit configured to perform processing for training a learning model based on the restoration accuracy and the frequency characteristic;
   (4) a selection unit configured to (1) obtain a distribution of the number of teacher images to be selected for each restoration accuracy from a plurality of teacher images based on a distribution of restoration accuracies obtained by inputting respective frequency characteristics of a plurality of reference images into the learning model and a pre-generated distribution of the number of selections corresponding to restoration accuracies and (2) select, as main training teacher images, some teacher images from the plurality of teacher images based on the obtained distribution; and
   (5) a generation unit configured to generate a data set including the main training teacher images and deteriorated images for which deterioration has been added to the main training teacher images.

2. The image processing apparatus according to claim 1, wherein the first obtaining unit obtains, as the restoration accuracy, a difference between the teacher image and a deterioration-restored image obtained by the processing for restoring the deteriorated image.

3. The image processing apparatus according to claim 1, wherein the first training unit performs training of the learning model such that output of the learning model to which the frequency characteristic has been inputted will be the restoration accuracy.

4. The image processing apparatus according to claim 1, wherein the plurality of units further comprises a second training unit configured to perform processing for training a learning model for inferring a pre-deterioration image from an image to which deterioration has been added, using the data set.

5. The image processing apparatus according to claim 1, wherein the first obtaining unit obtains, as the teacher images, some patches from a plurality of patches obtained by dividing an input image.

6. The image processing apparatus according to claim 5, wherein the first obtaining unit obtains, as the teacher images, the some patches such that an average of frequency characteristics of the plurality of patches and an average of frequency characteristics of the some patches coincide.

7. The image processing apparatus according to claim 5, wherein the first obtaining unit obtains, as the teacher images, the some patches from the plurality of patches obtained by dividing the input image such that an average of frequency characteristics of a group of input images and an average of frequency characteristics of the some patches coincide.

8. An image processing apparatus comprising:
   one or more processors and a memory, which are configured to function as a plurality of units comprising:
   (1) a first obtaining unit configured to obtain a restoration accuracy of processing for restoring a teacher image from a deteriorated image for which deterioration has been added to the teacher image;

(2) a second obtaining unit configured to obtain a frequency characteristic of the teacher image;

(3) a first training unit configured to perform processing for training a learning model based on the restoration accuracy and the frequency characteristic;

(4) a selection unit configured to select, as main training teacher images, some teacher images from a plurality of teacher images based on a distribution of restoration accuracies obtained by inputting respective frequency characteristics of a plurality of reference images into the learning model; and (5) a generation unit configured to generate a data set including the main training teacher images and images for which deterioration has been added to the main training teacher images.

9. An image processing apparatus comprising:

one or more processors and a memory, which are configured to function as a plurality of units comprising:

(1) a first obtaining unit configured to obtain a restoration accuracy of processing for restoring a teacher image from a deteriorated image for which deterioration has been added to the teacher image;

(2) a second obtaining unit configured to obtain a frequency characteristic of the teacher image;

(3) a first training unit configured to perform processing for training a learning model based on the restoration accuracy and the frequency characteristic;

(4) a selection unit configured to select, as main training teacher images, some teacher images from a plurality of teacher images based on a pre-generated distribution of the number of selections corresponding to restoration accuracies; and (5) a generation unit configured to generate a data set including the main training teacher images and images for which deterioration has been added to the main training teacher images.

10. An image processing method comprising:

obtaining a restoration accuracy of processing for restoring a teacher image from a deteriorated image for which deterioration has been added to the teacher image;

obtaining a frequency characteristic of the teacher image;

performing processing for training a learning model based on the restoration accuracy and the frequency characteristic;

obtaining a distribution of the number of teacher images to be selected for each restoration accuracy from a plurality of teacher images based on a distribution of restoration accuracies obtained by inputting respective frequency characteristics of a plurality of reference images into the learning model and a pre-generated distribution of the number of selections corresponding to restoration accuracies;

selecting, as main training teacher images, some teacher images from the plurality of teacher images based on the obtained distribution; and generating a data set including the main training teacher images and deteriorated images for which deterioration has been added to the main training teacher images.

11. A non-transitory computer-readable storage medium storing a computer program, wherein the computer program causes a computer, including one or more processors and a memory, to function as a plurality of units comprising:

(1) a first obtaining unit configured to obtain a restoration accuracy of processing for restoring a teacher image from a deteriorated image for which deterioration has been added to the teacher image;

(2) a second obtaining unit configured to obtain a frequency characteristic of the teacher image;

(3) a first training unit configured to perform processing for training a learning model based on the restoration accuracy and the frequency characteristic;

(4) a selection unit configured to (1) obtain a distribution of the number of teacher images to be selected for each restoration accuracy from a plurality of teacher images based on a distribution of restoration accuracies obtained by inputting respective frequency characteristics of a plurality of reference images into the learning model and a pre-generated distribution of the number of selections corresponding to restoration accuracies and (2) select, as main training teacher images, some teacher images from the plurality of teacher images based on the obtained distribution; and (5) a generation unit configured to generate a data set including the main training teacher images and deteriorated images for which deterioration has been added to the main training teacher images.

\* \* \* \* \*